(12) United States Patent
Allam et al.

(10) Patent No.: US 8,793,378 B2
(45) Date of Patent: Jul. 29, 2014

(54) IDENTIFYING SERVICES AND ASSOCIATED CAPABILITIES IN A NETWORKED COMPUTING ENVIRONMENT

(75) Inventors: Abdul Allam, Raleigh, NC (US); William A. Brown, Raleigh, NC (US); Raman Harishankar, Blacklick, OH (US); Siva P. Kantamneni, Largo, FL (US)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 13/223,462

(22) Filed: Sep. 1, 2011

(65) Prior Publication Data

US 2013/0060945 A1 Mar. 7, 2013

(51) Int. Cl.
*G06F 9/50* (2006.01)
*G06F 9/455* (2006.01)

(52) U.S. Cl.
CPC . *G06F 9/50* (2013.01); *G06F 9/455* (2013.01)
USPC .................. 709/226; 709/223; 709/240

(58) Field of Classification Search
None
See application file for complete search history.

(56) References Cited

U.S. PATENT DOCUMENTS

| 7,574,496 | B2 | 8/2009 | McCrory et al. | |
|---|---|---|---|---|
| 2002/0101881 | A1* | 8/2002 | Sundaresan et al. | 370/468 |
| 2003/0182413 | A1* | 9/2003 | Allen et al. | 709/223 |
| 2009/0300210 | A1 | 12/2009 | Ferris | |
| 2010/0042720 | A1 | 2/2010 | Stienhans et al. | |
| 2010/0050172 | A1 | 2/2010 | Ferris | |
| 2010/0088150 | A1 | 4/2010 | Mazhar et al. | |
| 2010/0125664 | A1 | 5/2010 | Hadar et al. | |
| 2010/0125669 | A1 | 5/2010 | Esfahany et al. | |
| 2010/0235355 | A1 | 9/2010 | Carter et al. | |
| 2010/0271949 | A1* | 10/2010 | Yoon et al. | 370/235 |
| 2010/0332262 | A1 | 12/2010 | Horvitz et al. | |
| 2010/0332401 | A1 | 12/2010 | Prahlad et al. | |
| 2010/0332818 | A1 | 12/2010 | Prahlad et al. | |
| 2011/0016214 | A1 | 1/2011 | Jackson | |
| 2011/0022642 | A1 | 1/2011 | DeMilo et al. | |
| 2011/0055396 | A1 | 3/2011 | Dehaan | |
| 2011/0055398 | A1 | 3/2011 | Dehaan et al. | |

(Continued)

OTHER PUBLICATIONS

Calheiros, R. et al., "CloudSim: A Novel Framework for Modeling and Simulation of Cloud Computing Infrastructures and Services", Dr. Rajkumar Buyya's Website, 2009, 9 pages.

(Continued)

*Primary Examiner* — Douglas W Owens
*Assistant Examiner* — Monica C King
(74) *Attorney, Agent, or Firm* — William E. Schiesser; D'Alessandro, PLLC

(57) ABSTRACT

In general, embodiments of the present invention classify cloud computing environments based on the abstraction layers that the cloud computing environments span and by combining the re-usable capabilities/logical components from these layers. In a typical embodiment, input (e.g., a set of requirements, a set of preferences, a set of costs parameters, and/or a request for feedback) pertaining to a set of services available in the networked computing environment is received from a requester via a network node. Based on the input, a set of capabilities and a corresponding set of logical components of the networked computing environment are identified. Thereafter, a set of providers capable of providing at least one of the set of services is identified and ranked. The set of logical components is then configured to provide the set of services according to the input, and made available to the requester.

19 Claims, 13 Drawing Sheets

(56) References Cited

U.S. PATENT DOCUMENTS

| | | | |
|---|---|---|---|
| 2011/0282886 A1* | 11/2011 | O'Donnell et al. | 707/748 |
| 2011/0296020 A1* | 12/2011 | Deng et al. | 709/226 |
| 2012/0072581 A1* | 3/2012 | Tung et al. | 709/224 |
| 2012/0124211 A1* | 5/2012 | Kampas et al. | 709/226 |
| 2012/0226799 A1* | 9/2012 | Kapur et al. | 709/224 |
| 2012/0271874 A1* | 10/2012 | Nugent | 709/201 |
| 2012/0311135 A1* | 12/2012 | DeLuca et al. | 709/224 |

OTHER PUBLICATIONS

"Cloud computing in education", A Microsoft U.S. Education white paper (Apr. 2010), www.microsoft.com, 20 pages.

Maitland, J., "Keeping Control Isn't Easy", Chapter 4: Cloud-Based Infrastructure, SearchCloudComputing.com, 13 pages.

Mell et al., "The NIST Definition of Cloud Computing", National Institute of Standards and Technology, Information Technology Laboratory, Version 15, Oct. 7, 2009, 2 pages.

* cited by examiner

| CC CODE | LOGICAL COMPONENTS |
|---|---|
| CC1 | LAYER2: VIRTUALIZED H/W & S/W<br>LAYER 4: PROVISIONING & SUBSCRIPTION |
| CC2 | LAYER2: VIRTUALIZED H/W & S/W<br>LAYER 4: PROVISIONING & SUBSCRIPTION<br>LAYER7: MONITORING, BILLING, METERING |
| CC3 | LAYER2: VIRTUALIZED H/W & S/W<br>LAYER 4: PROVISIONING & SUBSCRIPTION<br>LAYER5: VERTICAL BUS SERVICES – INDUSTRY SPECIFIC<br>LAYER7: MONITORING, BILLING, METERING |
| CC4 | LAYER2: VIRTUALIZED H/W & S/W<br>LAYER 3: VERTICAL BUS SERVICES – INDUSTRY SPECIFIC<br>LAYER 4: PROVISIONING & SUBSCRIPTION<br>LAYER7: MONITORING, BILLING, METERING |
| CC5 | LAYER2: VIRTUALIZED H/W & S/W<br>LAYER 4: PROVISIONING & SUBSCRIPTION,<br>SLA MGMT, ACCT MGMT, ORDER MGMT<br>LAYER5: BUS PROC AS SERVICE<br>LAYER7: MONITORING, BILLING, METERING |

IDENTIFYING SERVICES AND ASSOCIATED CAPABILITIES IN A NETWORKED COMPUTING ENVIRONMENT

TECHNICAL FIELD

In general, the present invention relates to a process for users (e.g., providers and/or consumers) of networked computing environments (e.g., cloud computing environments) to identify appropriate services and capabilities that are available within a networked computing environment. Specifically, embodiments of the present invention relate to a standards-based approach for communicating service capabilities while determining detailed implementations of the underlying computing components such that the underlying computing components remain abstracted from the users.

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, storage devices, among others.

Challenges can exist with current computing environments in that these environments may not properly "abstract" computing infrastructure components (e.g., when needed). Moreover, some current cloud computing models may not properly separate services and resources that a particular cloud environment offers to meet the needs of users (e.g., customers and/or provider). As such, current cloud computing models can be inefficient and may fail to address the specific needs of individual customers.

SUMMARY

In general, embodiments of the present invention classify cloud computing environments based on the abstraction layers that the cloud computing environments span and by combining the re-usable capabilities/logical components from these layers. In a typical embodiment, input (e.g., a set of requirements, a set of preferences, a set of costs parameters, and/or a request for feedback) pertaining to a set of services available in the networked computing environment is received from a requester via a network node. Based on the input, a set of capabilities and a corresponding set of logical components of the networked computing environment are identified. Thereafter, a set of providers capable of providing at least one of the set of services is identified and ranked. The set of logical components is then configured to provide the set of services according to the input, and made available to the requester.

A first aspect of the present invention provides a computer-implemented method for identifying services and associated capabilities in a networked computing environment, comprising: receiving input from a requester via a network node, the input pertaining to a set of services available in the networked computing environment; identifying a set of capabilities based on the input; identifying a set of logical components of the networked computing environment based on the set of capabilities; identifying and ranking a set of providers capable of providing at least one of the set of services; and configuring the set of logical components to provide the set of services according to the input.

A second aspect of the present invention provides a system for identifying services and associated capabilities in a networked computing environment, comprising: a memory medium comprising instructions; a bus coupled to the memory medium; and a processor coupled to the bus that when executing the instructions causes the system to: receive input from a requester via a network node, the input pertaining to a set of services available in the networked computing environment; identify a set of capabilities responsive to the input; identify a set of logical components of the networked computing environment based on the set of capabilities; identify and rank a set of providers capable of providing at least one of the set of services; and configure the set of logical components to provide the set of services according to the input.

A third aspect of the present invention provides a computer program product for identifying services and associated capabilities in a networked computing environment, the computer program product comprising a computer readable storage media, and program instructions stored on the computer readable storage media, to: receive input from a requester via a network node, the input pertaining to a set of services available in the networked computing environment; identify a set of capabilities responsive to the input; identify a set of logical components of the networked computing environment based on the set of capabilities; identify and rank a set of providers capable of providing at least one of the set of services; and configure the set of logical components to provide the set of services according to the input.

A fourth aspect of the present invention provides a method for deploying a system for identifying services and associated capabilities in a networked computing environment, comprising: providing a computer infrastructure being operable to: receive input from a requester via a network node, the input pertaining to a set of services available in the networked computing environment; identify a set of capabilities responsive to the input; identify a set of logical components of the networked computing environment based on the set of capabilities; identify and rank a set of providers capable of providing at least one of the set of services; and configure the set of logical components to provide the set of services according to the input.

BRIEF DESCRIPTION OF THE DRAWINGS

These and other features of this invention will be more readily understood from the following detailed description of the various aspects of the invention taken in conjunction with the accompanying drawings in which:

FIG. 8A-B depicts a cloud layer diagram and cloud classification chart according to an embodiment of the present invention.

Figure 1:
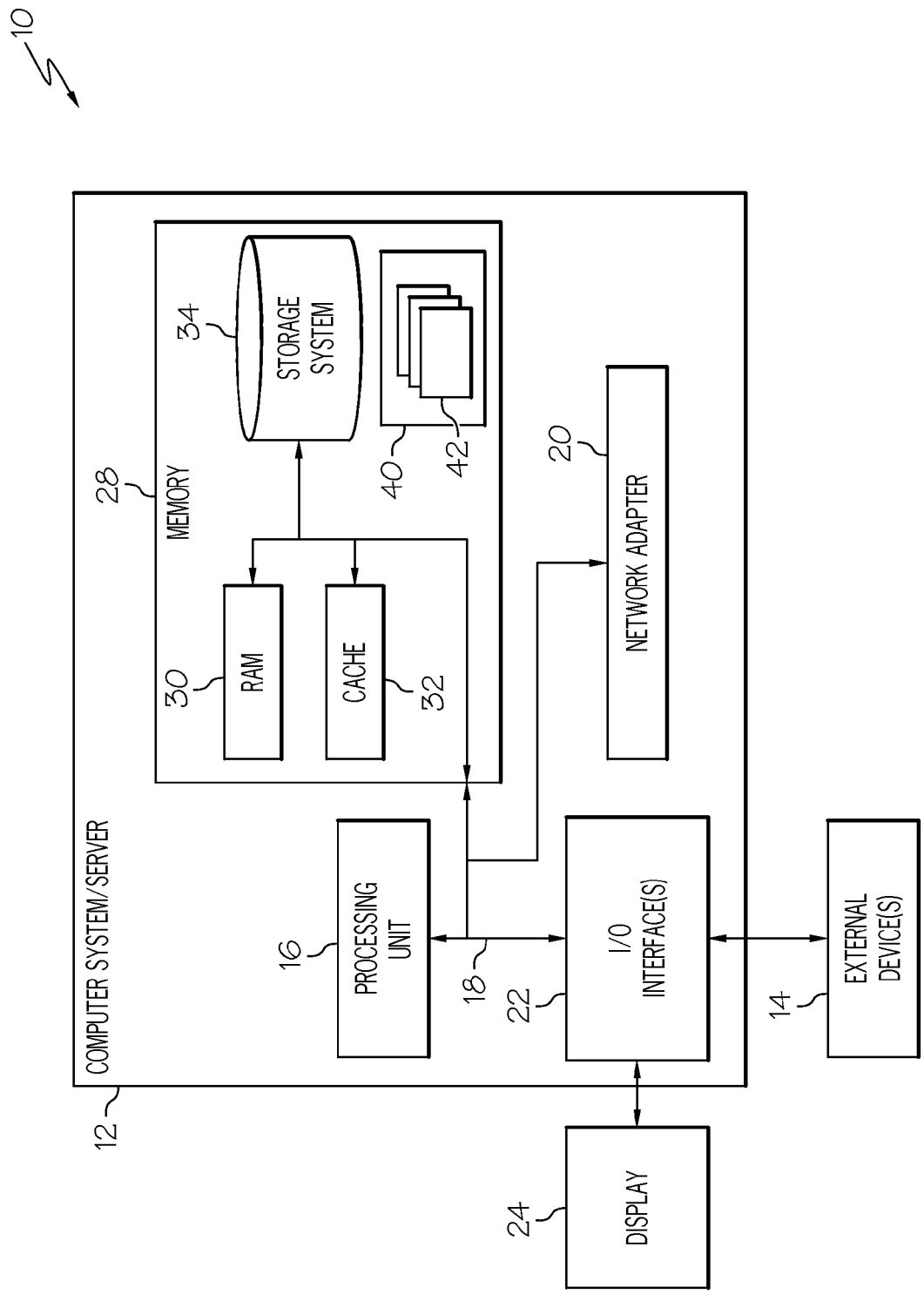
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

In general, embodiments of the present invention classify cloud computing environments based on the abstraction layers that the cloud computing environments span and by combining the re-usable capabilities/logical components from these layers. In a typical embodiment, input (e.g., a set of requirements, a set of preferences, a set of costs parameters, and/or a request for feedback) pertaining to a set of services available in the networked computing environment is received from a requester via a network node. Based on the input, a set of capabilities and a corresponding set of logical components of the networked computing environment are identified. Thereafter, a set of providers capable of providing at least one of the set of services is identified and ranked. The set of logical components is then configured to provide the set of services according to the input, and made available to the requester.

Among other things, embodiments of the present invention: allow the cloud consumers to identify what cloud capabilities they are interested in and for the cloud providers to identify what cloud capabilities they would be interested in addressing and participating to support their client needs; provide common terminology for communicating cloud capabilities; and/or help determine the level of abstraction needed to hide the complexity of underlying cloud components (e.g., cloud reference architecture with categorization capability as explained hereinbelow). As will be discussed, this classification is the combining of the capabilities from within a layer and/or from across layers.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
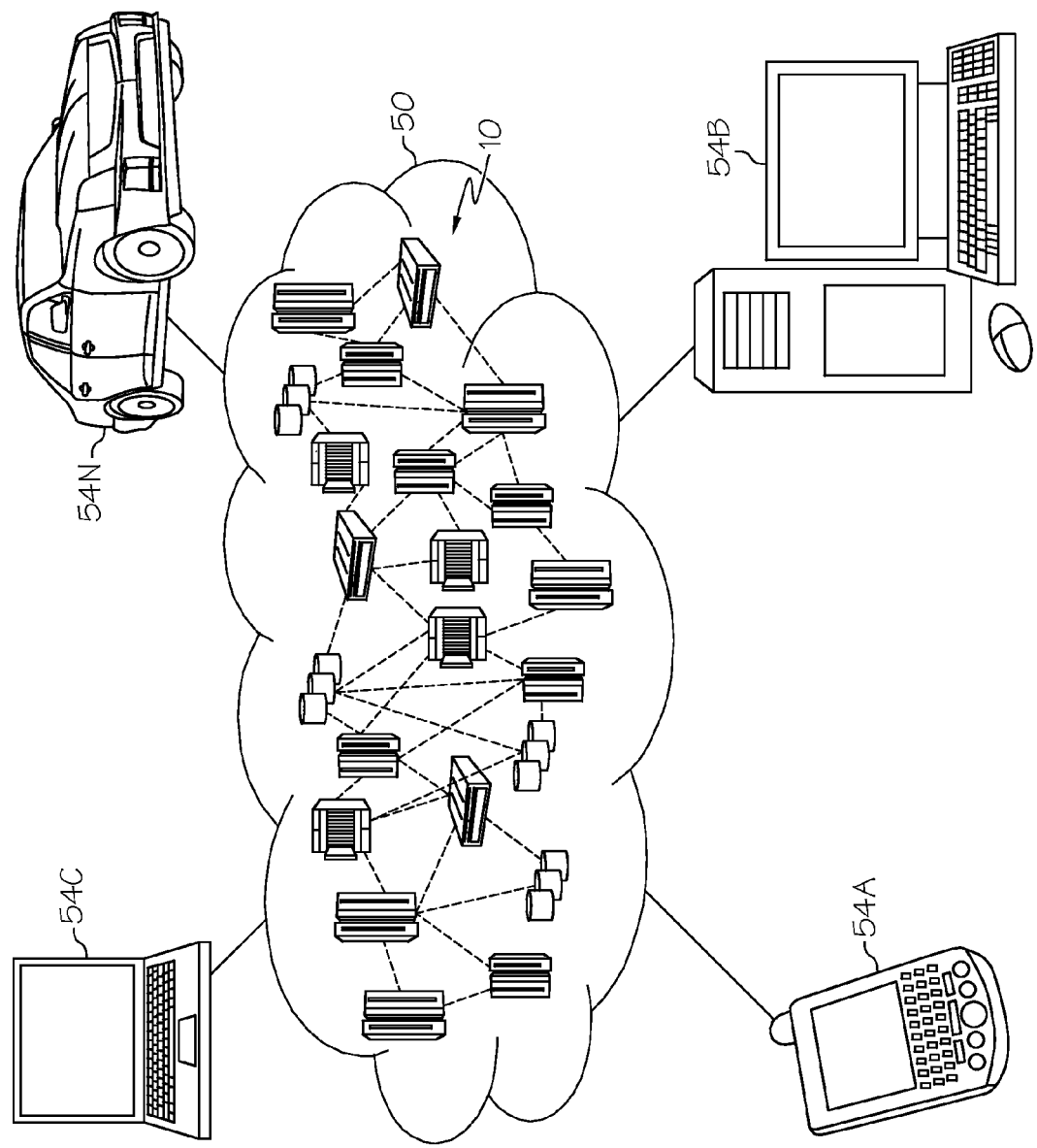
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
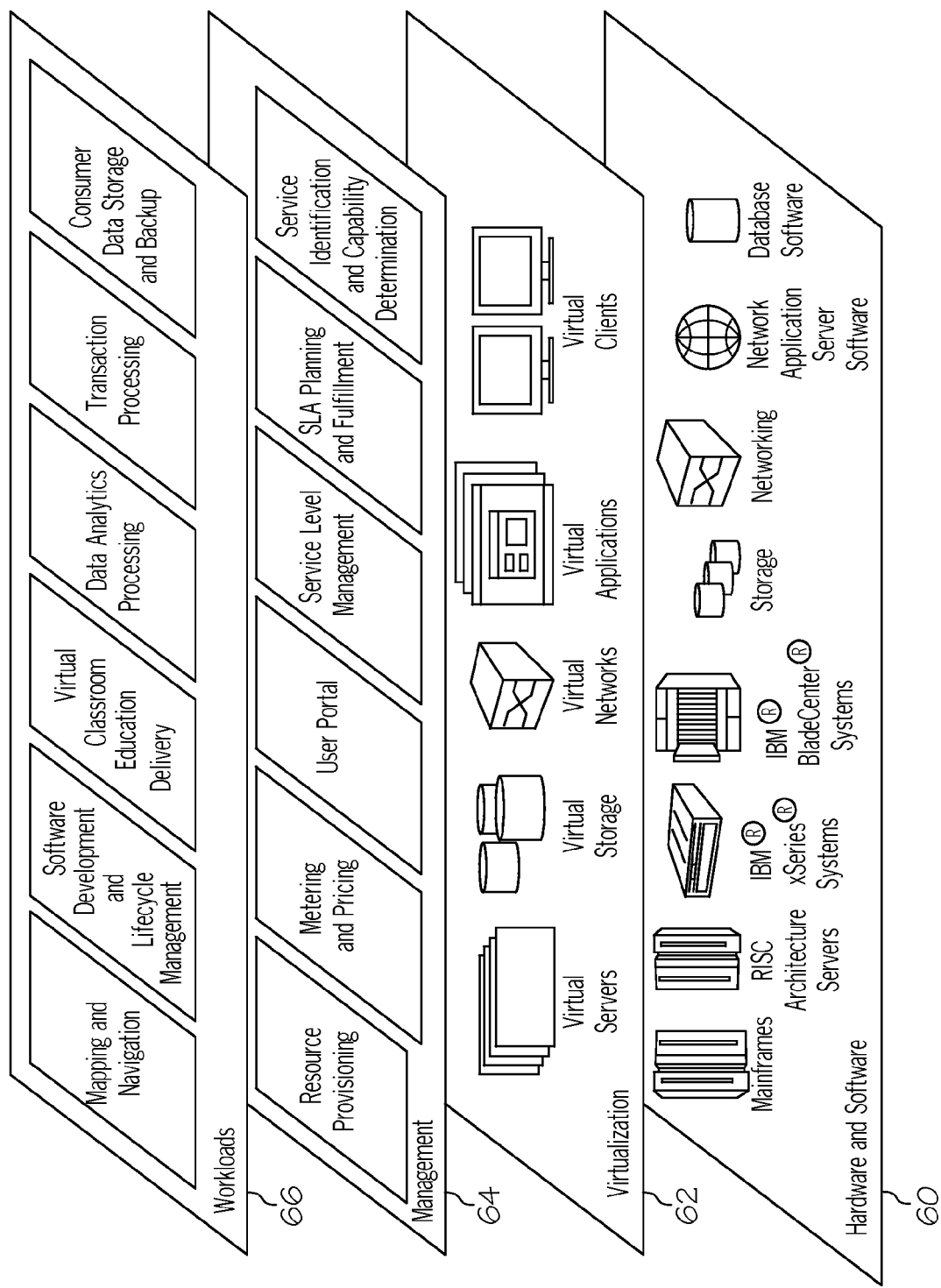
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is service identification and capability determination function, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the service identification and capability determination functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
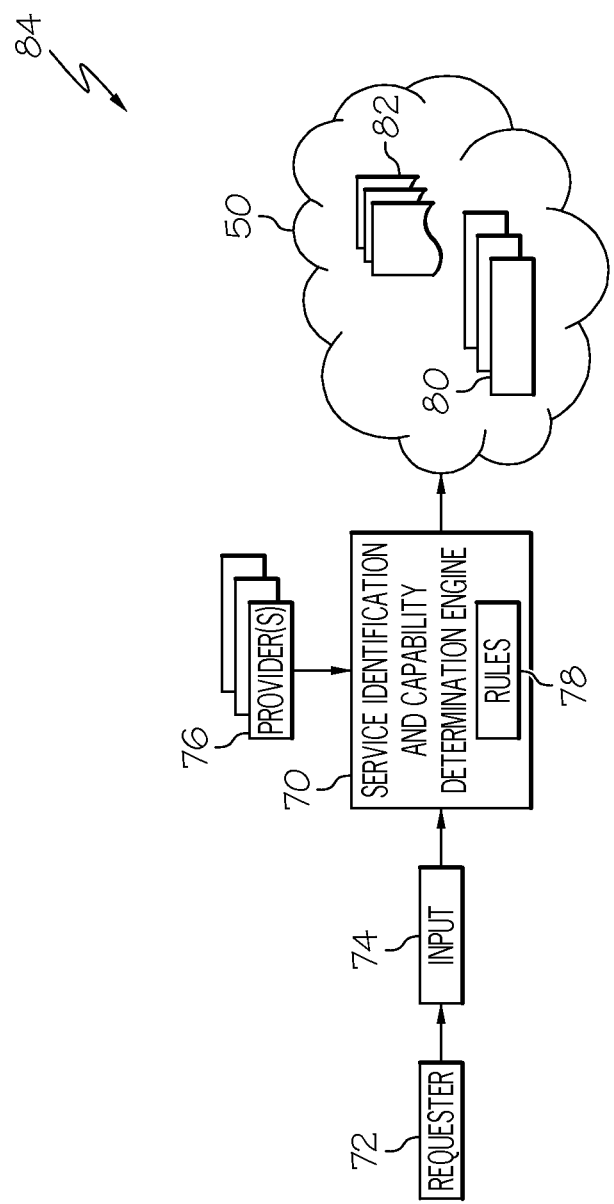
FIG. 4 depicts a system diagram according to an embodiment of the present invention.

Referring now to FIG. 4, a system diagram according to an aspect of the present invention is shown. As depicted, a service identification and capability determination engine (engine 70) is shown. In general, engine 70 can be implemented as program 40 on computer system 12 of FIG. 1 and can implement the functions recited herein as depicted in management layer 64 of FIG. 3. In general, engine 70 comprises (in one embodiment) a rules engine that processes a set (at least one) of rules 78 and utilizes input to identify a set of services 80 and their associated capabilities within a networked computing environment 84 (e.g., cloud environment 50).

Along these lines, engine 70 may perform multiple functions. Specifically, among other functions, engine 70 may: receive input 74 (e.g., a set of requirements, a set of preferences, a set of costs parameters, and/or a request for feedback, etc.) from a requester 72 via a network node or the like, the input 74 pertaining to a set of services 80 available in the networked computing environment (e.g., a cloud computing environment); identify a set of capabilities responsive to the input; identify a set of logical components 82 (e.g., associated with a set of abstraction layers of the networked computing environment 84) based on the set of capabilities; identify and ranking a set of providers 76 capable of providing at least one of the set of services 80; configure the set of logical components 82 to provide the set of services 80 according to the input 74; map the set of logical components 82 to a set of cloud classification codes; calculate a cost for each of the set of providers 76 to provide the set of services 80; make the configured set of logical components 82 available to the requester 72.

Figure 5:
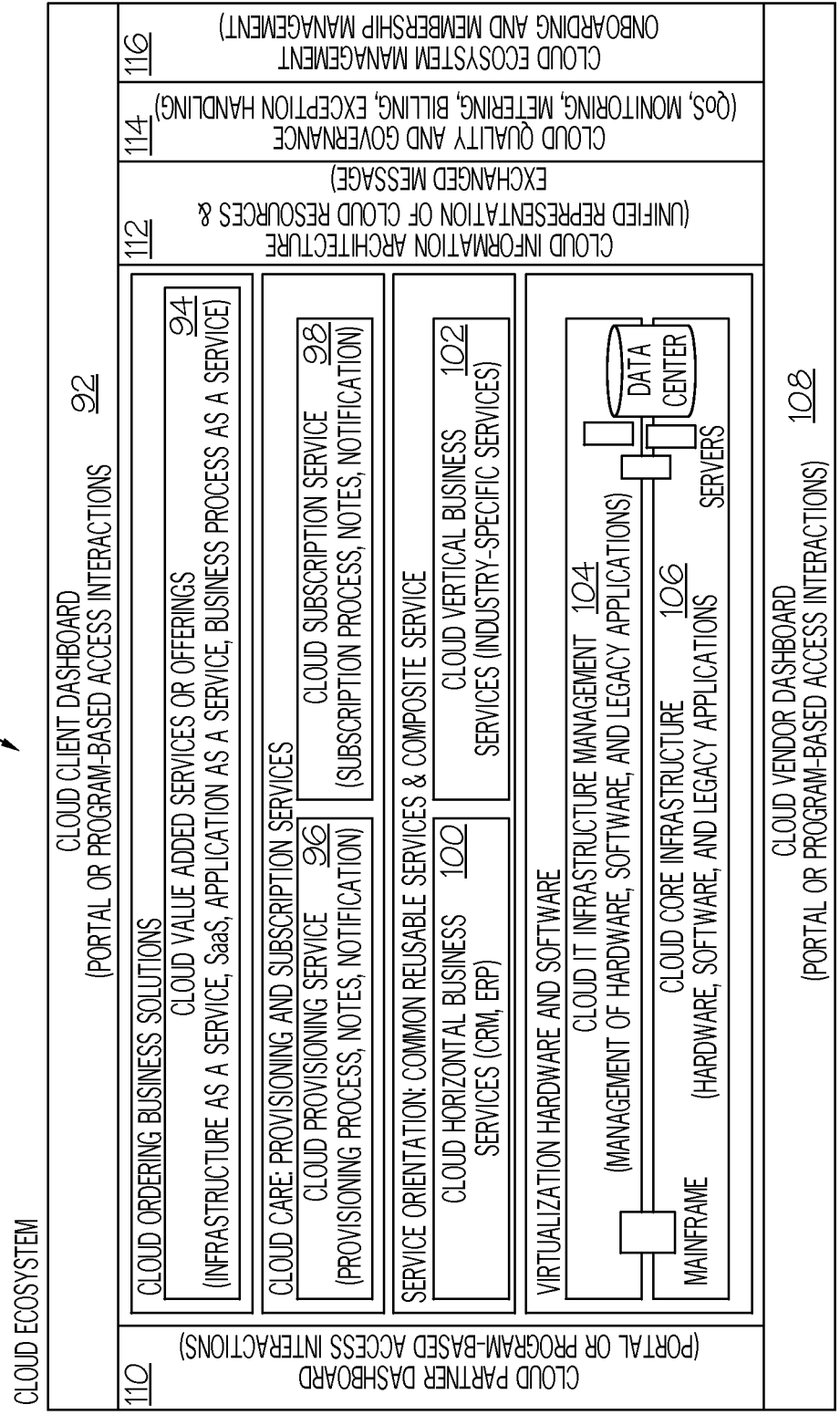
FIG. 5 depicts a diagram showing service-oriented architecture (SOA) and virtualization of resources according to an embodiment of the present invention.

Referring now to FIG. 5, a diagram showing service-oriented architecture (SOA 90) and virtualization of resources according to an embodiment of the present invention is shown. As depicted, SOA 90 comprises components/modules distributed across various architectural layers such as the following: cloud client dashboard 92 (e.g., portal or program-based access interactions), cloud value added services or offerings 94 (e.g., IaasS, SaaS, AaaS, BPaaS, etc.), cloud provisioning service 96 (e.g., provisioning process, roles, notifications, etc.), cloud subscription service 98 (subscription process, roles, notifications, etc.), cloud horizontal business services 100 (e.g., customer relations management (CRM), enterprise resource planning (ERP)), cloud vertical business services 102 (e.g., industry specific services, etc.), cloud IT infrastructure management 104 (e.g., management of hardware, software, and legacy applications, etc.), cloud core infrastructure 106 (e.g., hardware, software, and legacy applications, etc.), cloud vendor dashboard 108 (e.g., portal or program-based access interactions), cloud partner dashboard 110 (e.g., portal or program-based interactions), cloud information architecture 112 (e.g., unified representations of cloud resources and exchanged messages, etc.), cloud quality and governance 114 (quality of service (QoS) monitoring, metering, billing, exception handling etc.), and/or cloud ecosystem management 116 (e.g., on-boarding and membership management).

Figure 6:
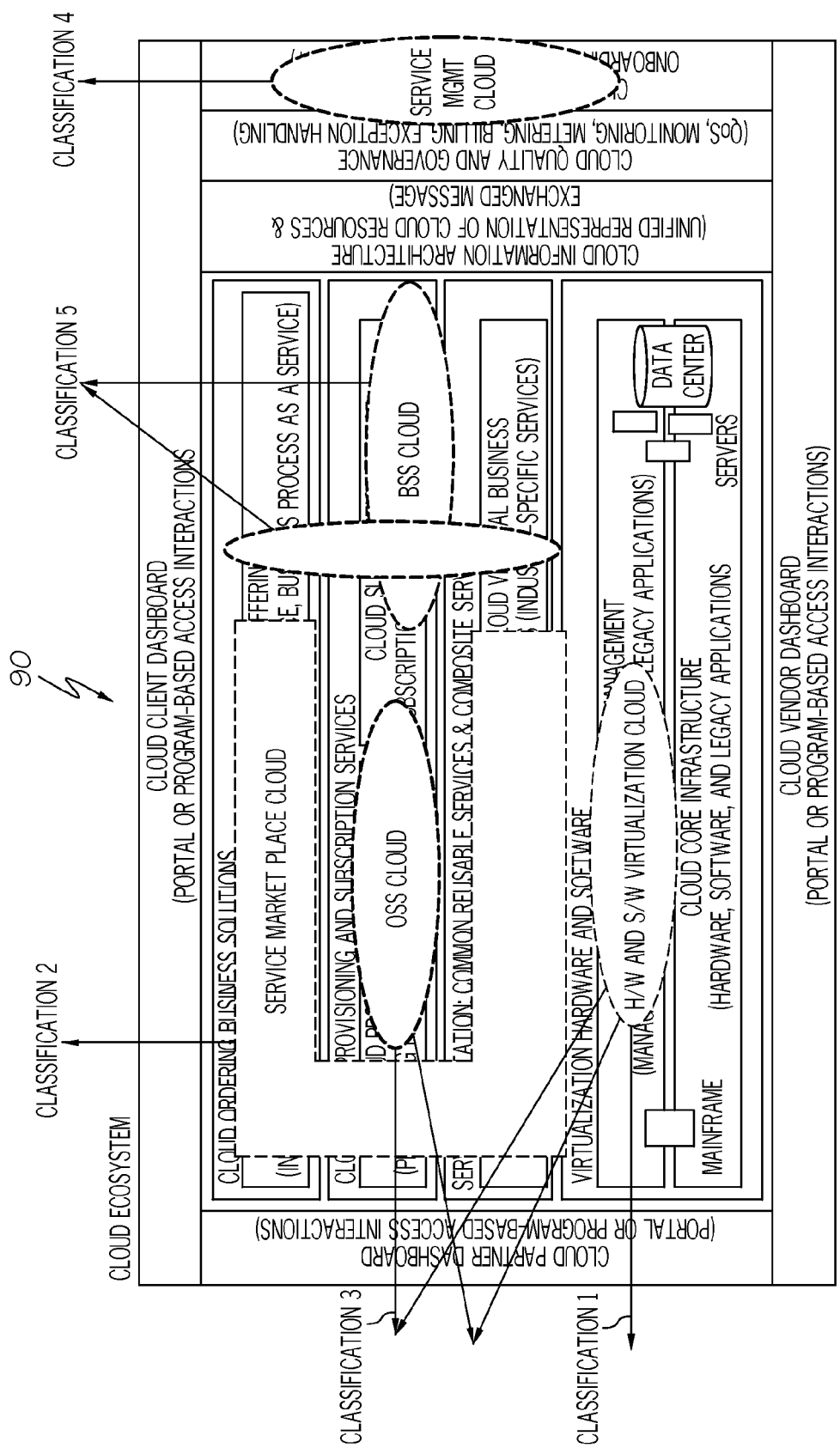
FIG. 6 depicts a diagram showing cloud environment classification based on capabilities from different cloud environment layers according to an embodiment of the present invention.

In general, the classification of components of a cloud environment can be achieved by combining capabilities from within a layer and/or from across layers (e.g., by mixing and matching capabilities). This could augment the planning and designing of cloud computing solutions in a more effective manner so as to suit the needs of both could service consumers and cloud service providers. For example, FIG. 6 depicts a diagram showing cloud environment classification based on capabilities from different cloud environment layers according to an embodiment of the present invention. In FIG. 6, classifications 1-5 are shown and utilize layers of SOA 90 as follows:

Classification 1 (hardware (H/W) and software (S/W) virtualization cloud) utilizes cloud IT infrastructure management 104;

Classification 2 (service market placement cloud) utilizes cloud value added services or offering 84, cloud provisioning service 96, and cloud horizontal business services 100;

Classification 3 (operational support system (OSS) cloud) utilizes cloud provisioning service 96, and cloud information architecture 112;

Classification 4 (service management cloud) utilizes cloud ecosystem management 116;

Classification 5 (business support system (BSS) cloud) utilizes cloud subscription service 98, cloud information architecture 112, and cloud quality and governance 114.

It is noted that in FIG. 6, each classification fulfills specific business needs such as hardware virtualization, an OSS cloud, a service workplace cloud, etc. These classifications create a logical understanding between the business usage of the classification and its supporting infrastructure.

As indicated above, embodiments of the present invention utilize capabilities in the layered cloud architecture to help classify the cloud computing environments. The cloud environment can be classified by combining capabilities from a specific layer or from different layers using a cloud classification. Along these lines, engine 70 can be implemented as a toolkit, or the like, such as an plug-in to modeling tools such as Rational Software Architect (RSA).

Regardless, engine 70 could, through a dashboard or the like, take user (e.g., a consumer or provider of cloud computing environment 50) input. The user input could be collected interactively through context specific menus and dropdown list. The input could include: requirements—storage, applications; preferences—service level, response time; constraints/parameters—budgetary/costs; and/or request for advice on cloud classification for a service offering a provider has or is planning to offer to consumers. Engine 70 will then use this as input to determine what cloud capabilities would be required. In a typical embodiment, engine 70 could use a pattern matching algorithm to determine the capabilities required based on the input provided. In the next step, the cloud capabilities will be used to identify the logical components from one or more layers of the cloud architecture required to support the cloud user needs. The logical components could be used as the basis for cloud classification. The cloud classifications will typically be managed through a knowledge base or the like. Engine 70 could then use the classification cloud to select the potential cloud service providers. These providers will be ranked based on: the preferences and constraints specified by the cloud user; and/or how well the cloud providers had performed in the past to support similar types of preference and constraints. In order to do, this ranking a knowledge base of cloud provider performance will be used. This knowledge base could be offered through a trusted third party.

Figure 7:
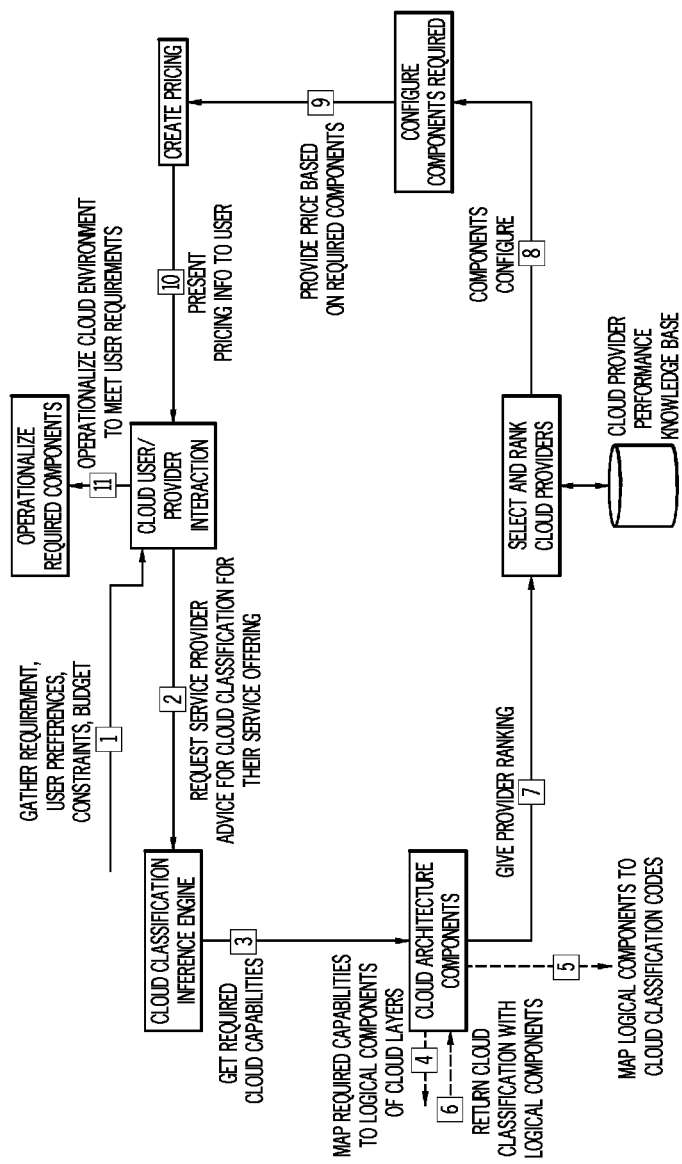
FIG. 7 depicts a process flow diagram according to an embodiment of the present invention.
Figure 8A:
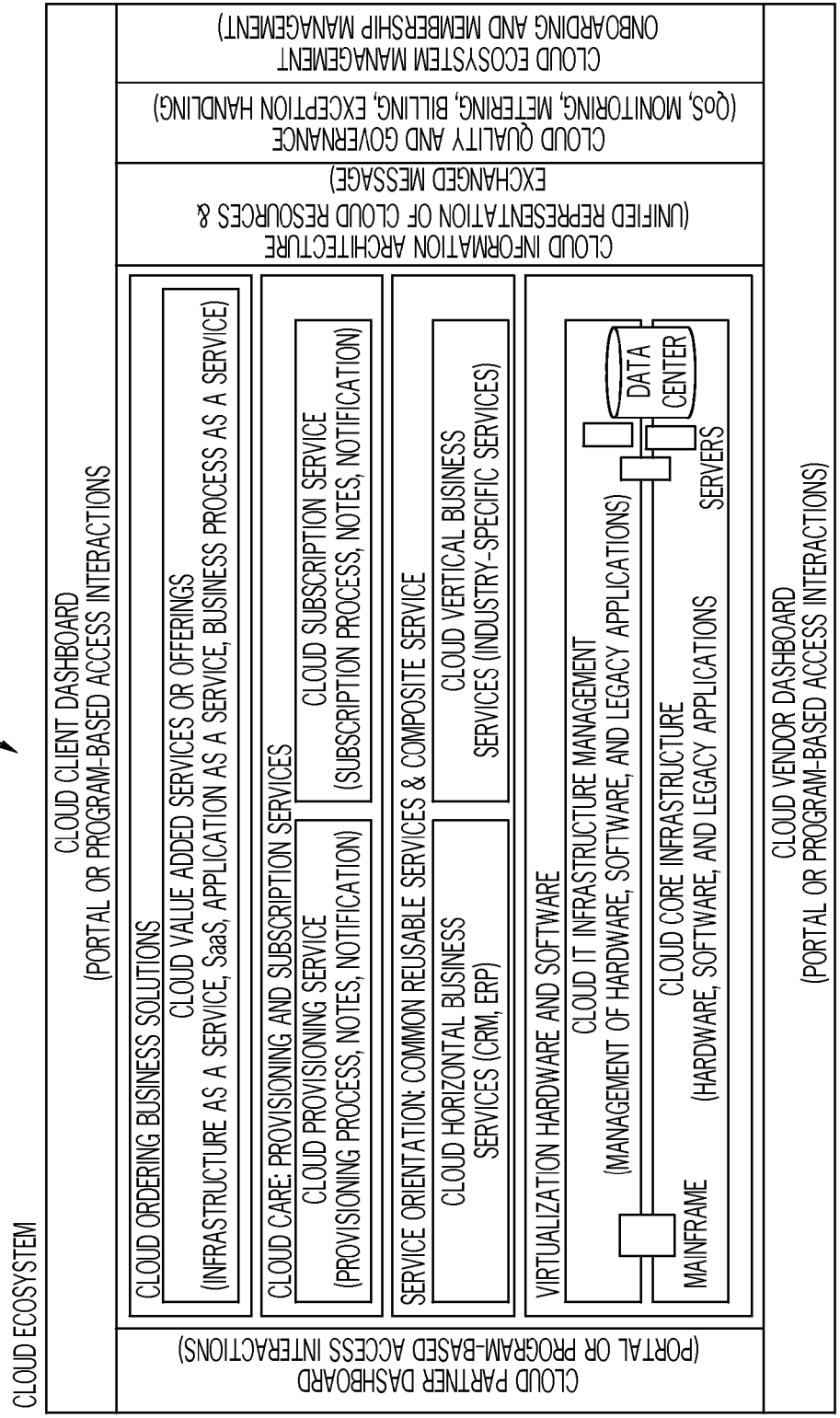

Referring now to FIGS. 7 and 8A-B collectively, a process flow according to an embodiment of the present invention will be discussed in greater detail.

As specifically detailed in FIGS. 7-8A-B, the process could flow as follows:

1. Gather Requirements/Input: The user will be presented with a user interface (UI) to provide their preferences with respect type of service provider, service level characteristics, and budget constraints
2. Request Service Provider Advice: The user would request cloud classification from service provider that would meet their requirements. Cloud classification is based on assembly or combination of logical components from various cloud layers.
3. Get Required Capabilities: the engine requests the "Cloud Architecture Components" module for cloud capabilities required to meet user requirement.
4. Map Required Capabilities: The logical components from various layers of cloud computing architecture that are required to meet user requirements are matched and identified.
5. Map Logical Components to Cloud Classification Code: The logical components identified are used to identify the cloud classification they belong to. Each cloud classification contains a set of logical components. As shown in FIG. 8A-B, the selection of classification codes results in a predetermined set of logical cloud components. New classification codes can be created by combining/assembling logical cloud components that would specify a set of user requirements. Specifically, FIG. 8B depicts cloud classification codes (CCs) CC1-CC5 in a chart 120 that corresponds to the layers of SOA 90. As shown, the following CCs correspond to the associated layers: CC1—layers 2 and 4; CC2—layers 2, 4, and 7; CC3—layers 2, 4, 5, and 7; CC4—layers 2, 3, 4, and 7; and CC5, layers 2, 4, 5, and 7.

6. Return Cloud Classification with Logical Components: Cloud classification code which consists of a set of logical components that meet user requirements are returned to "Cloud Architecture Components" component.
7. Get Provider Ranking: Cloud provider performance knowledge base is checked to see what has been the past performance of cloud service provider for a specific cloud classification code. This historical performance is used to rank the service provider.
8. Configure Components: The components from the ranked service providers that need to be configured are identified.
9. Provide pricing: Pricing for the required/configured components for each ranked service provider is created. Service level characteristics will have an impact on the pricing.
10. Present Pricing Information: The pricing for configured components by each ranked cloud service provider is presented to the requester of cloud service offering.
11. Operationalize required components: Once the user selects the service provider, the configured components from the selected provider are operationalized to make the cloud service available to service requester.

Figure 9A:
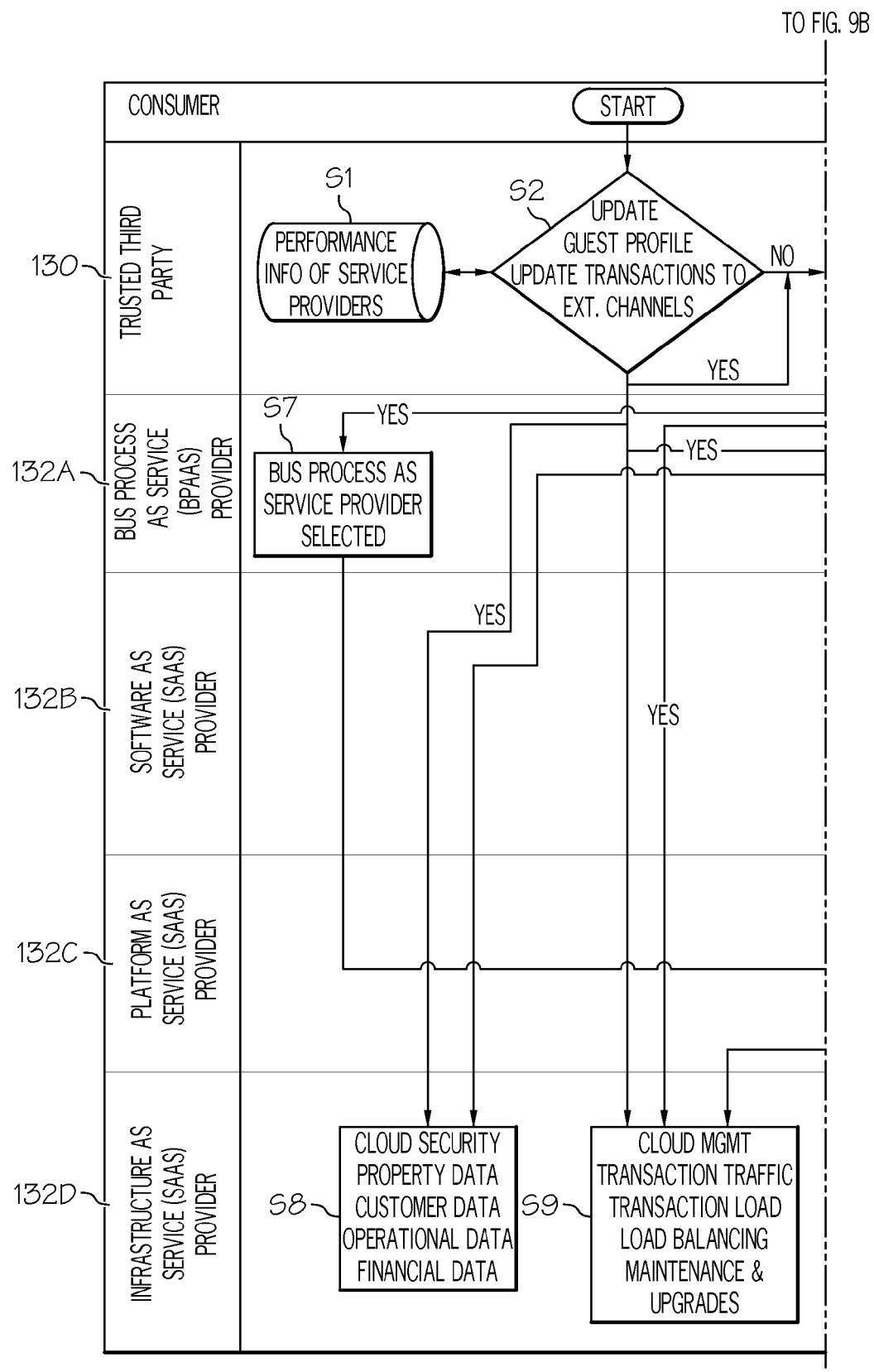
FIGS. 9A-C depicts a method flow diagram according to an embodiment of the present invention.
Figure 9B:
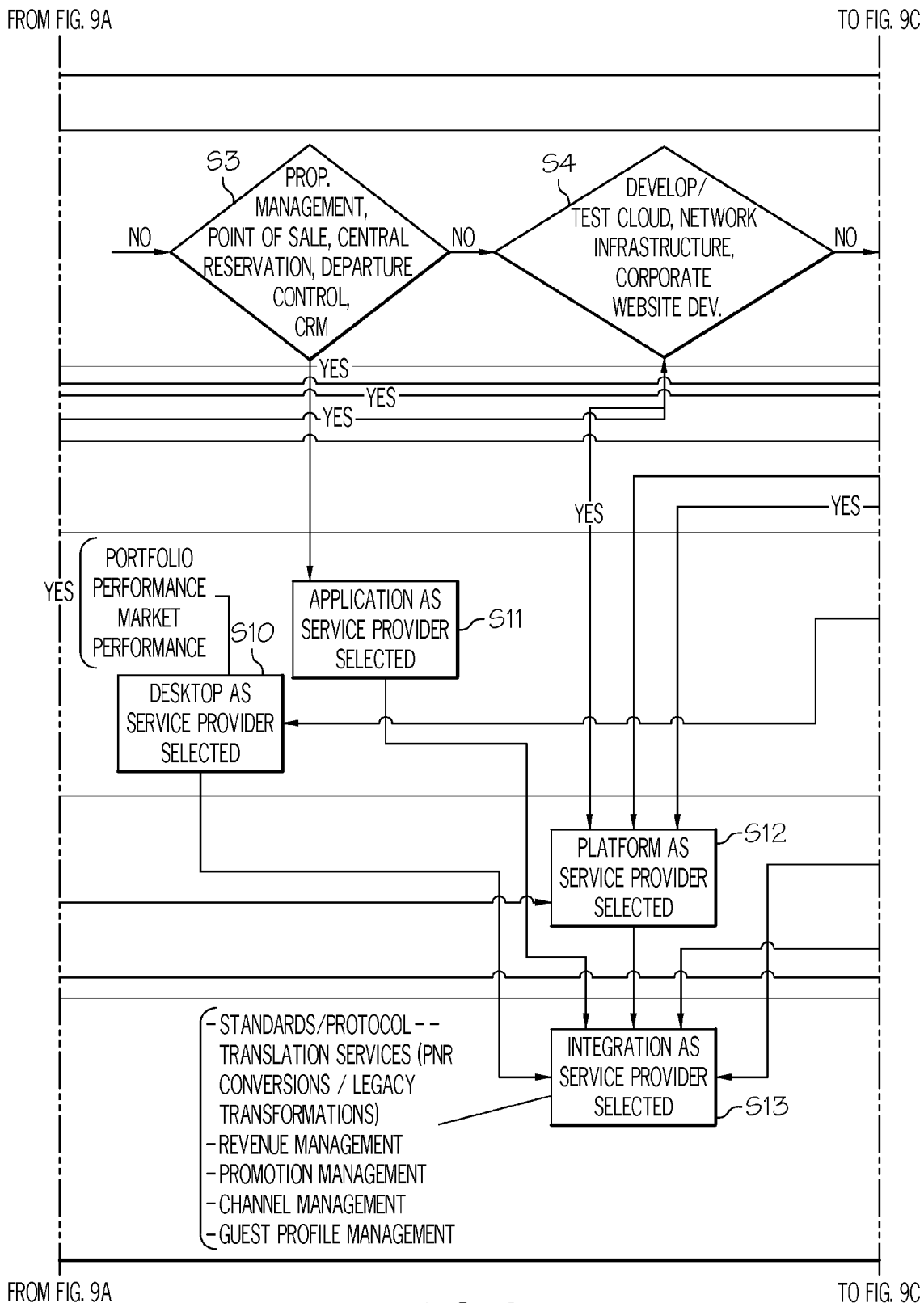
Figure 9C:
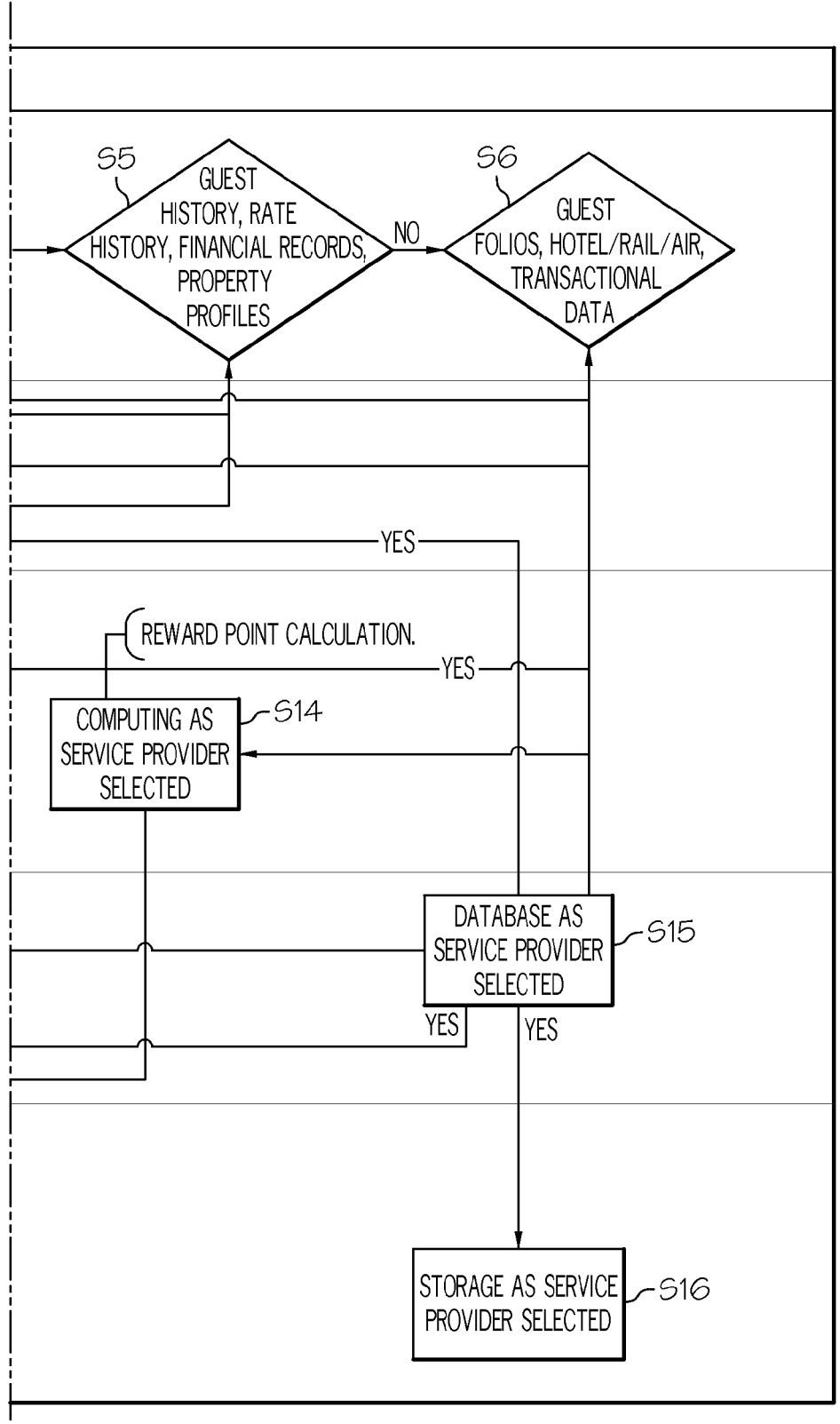

Referring now to FIG. 9A-C, a flow chart showing how a third party service provider 130 could use a knowledge database based on past performance of a service provider to rank and select the appropriate service provider based on the consumer needs is shown. It is understood that FIG. 9A-C uses the travel and transportation industry as an example, but similar teachings could be applied to other industries. In any event, as shown, there are four types of Cloud Service Providers 132A-D in FIG. 9A-C. In step S1, performance information of service providers is received and in step S2, it is determined whether an update to a guest profile is needed and/or updated transactions need to be provided to external channels. If so, cloud security management is performed in step S8 (e.g., updating property data, customer data, operational data, financial data, etc.), and cloud management is performed in step S9 (e.g., transaction traffic, transaction loads, load balancing, maintenance and upgrades, etc.). If no updates were needed in step S2, and/or once management is performed in step S9, the flow proceeds to step S3 where it will be determined whether property management is needed (e.g., point of sale, central reservation, departure control, customer relations management, etc.). If so, application as a service provider (AaaP) is selected in step S11, and integration as a service provider (IaaP) is selected in step S13. If not, the process flows to step S4 where it is determined whether development should be performed (e.g., test cloud, network infrastructure, corporate website development, etc.). If so, platform as a service provider (PaaP) is selected in step S12 and IaaP is selected in step S13. If not, the process flows to step S5, where it is determined whether other budget information needs to be updated (e.g., guest histories, rate histories, financial records, property profiles, etc.). If so, PaaP is selected in step S12, and IaaP is selected in step S13. If not, the process flows to step S6 where it is determined whether guest information needs to be updated (e.g., guest folios, hotel/rail/air, transactional information, etc.). If so, business process as service provider (BaaP) is selected in step S7, cloud management is performed in step S9, desktop as a service provider (DkaaP) is selected in step S10, computing as a service provider (CaaP) is selected in step S14, database as a service provider (DbaaP) is selected in step S15, storage as a service provider (SaaP) is selected in step S16. It is understood that other relationships and flows could exist in FIG. 10, such relationship have not been specifically described herein for brevity and readability purposes.

Figure 10:
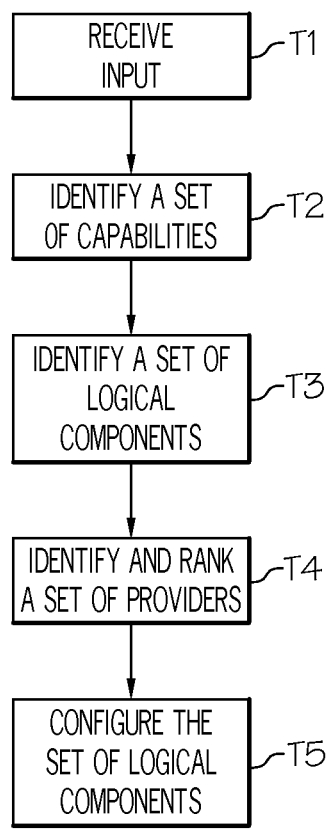
FIG. 10 depicts another method flow diagram according to an embodiment of the present invention.

Referring now to FIG. 10, a method flow diagram according to an embodiment of the present invention is shown. As depicted, in step T1, input is received from a requester via a network node, the input pertaining to a set of services available in the networked computing environment. In step T2, a set of capabilities is identified responsive to the input. In step T3, a set of logical components of the networked computing environment is identified based on the set of capabilities. In step T4, a set of providers capable of providing at least one of the set of services is identified and ranked. In step T5, the set of logical components is configured to provide the set of services according to the input.

Illustrative pseudo code: shown below is an example of illustrative pseudo code that could be utilized to implement one or more of the concepts discussed herein.

```
Operation - Evaluate customer input and generate cloud classification
Reads:
        supplied - business requirements
        supplied - non-functional requirements
        supplied - budget constraints
        supplied - preferences
Transforms:    Cloud Component Classification
               Cloud Logical Component Grouping
               Cloud Service Provider Ranking
Outputs:       Configured Cloud Components Price
Pre Condition:
        Cloud Service Provider Capabilities mapped to each layer
        exist
        Trusted Cloud Authority's Cloud Service Provider
        Performance
        Database exists
        Cloud Service Provider pricing data
Process:
    new Cloud Capabilities Required list
    new list service provider collection
    for each item in list {
        evaluate question 1 (is this related to business
        requirements?)
        if (Q1== true) {
            for each business requirement {
                for each cloud service provider {
                compare requirement with service provider
        capability
                    determine service provider fit for the requirement
                    if (fit == true) {
                        add service provider to collection
                        add requirement to list
                    }
            } /* end for */
            } /* end for */
        } /*end if */
        evaluate question 2 (is this related to non-functional
    requirements?)
        if (Q2== true) (
            for each non-functional requirement {
                for each cloud service provider {
                compare requirement with service provider
        capability
                    determine service provider fit for the requirement
                    if (fit == true) {
                        add service provider to collection if not
            already in it
                        add requirement to list
                    }
                else
                {
```

```
            if (service provider in collection == true)
                remove service provider from collection
            }
        ) /* end for */
    }/* end for */
}
evaluate question 3 (is this related to budget constraints?)
if (Q3== true) (
    for each budget constraint {
        for each cloud service provider {
        compare constraint with service provider
        capability
        determine service provider fit for the constraint
            if (fit == true) {
                add service provider to collection if not
                already in it
                    add constraint to list
            }
            else
            {
                if (service provider in collection == true)
                    remove service provider from collection
            }
        } /* end for */
    } /* end for */
}
evaluate question 4 (is this related to preferences?)
if (Q4== true) (
    for each preference {
        for each cloud service provider {
        evaluate preference with service provider
        capability
        determine service provider fit for the preference
            if (fit == true) {
                add service provider to collection if not
                already in it
                    add preference to list
            }
            else
            {
                if (service provider in collection == true)
                    remove service provider from collection
            }
        }/* end for */
    }/* end for */
}
if collection.size( ) == null
return null /* stop */
/* Step 2 Transform Cloud Capabilities to Logical
components */
new Logical Components clist
for each item in list {
map capability required to logical components of Cloud
Layers
add logical components to clist
} /* end for */
  new Cloud Classification hash table
for each item in list {
create a Cloud Classification ccode enumerating clist
components that address item
add ccode to hash table
} /* end for */
/* Step 3 Rank Cloud Service Providers */
new Service Provider scollection
for each item in the list {
sort items in collection accessing performance SLAs from
Cloud
Service Provider Performance Database
copy sorted collection items to scollection
} /* end for */
/* Step 4 Configure Cloud Classification Codes if needed */
if (collection != scollection) // determine differences
between
collection and scollection
{
    re-configure clist items
}
/* Step 5 determine pricing */
new Configured Cloud Components Price pricer
        for each item in clist {
            for each item in scollection {
            determine if the service provider offers Cloud
            Component
            compute pricing for Cloud Component
            add pricing to pricer
            }/* end for */
        } /* end for */
        return pricer
    } /* end for */
```

While shown and described herein as a service identification and capability determination solution, it is understood that the invention further provides various alternative embodiments. For example, in one embodiment, the invention provides a computer-readable/useable medium that includes computer program code to enable a computer infrastructure to provide service identification and capability determination functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide service identification and capability determination functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for service identification and capability determination. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for identifying services and associated capabilities in a networked computing environment, comprising:
   providing a set of cloud classification codes, wherein each cloud classification code of the set of cloud classification codes corresponds to a predetermined combination of architectural layers from a plurality of architectural layers;
   receiving input from a requester via a network node, the input pertaining to a set of services available in the networked computing environment;
   identifying a set of capabilities based on the input;
   identifying a set of logical components of the networked computing environment based on the set of capabilities, wherein each logical component of the set of logical components corresponds to at least one architectural layer of the plurality of architectural layers;
   mapping the set of logical components to at least one of the set of cloud classification codes based on a match between the at least one architectural layer and the predetermined combination of architectural layers;
   identifying and ranking a set of providers capable of providing at least one of the set of services based on historical data of past performance of each of the set of providers for a specific classification code from the set of classification codes; and
   configuring the set of logical components to provide the set of services according to the input.

2. The computer-implemented method of claim 1, the networked computing environment comprising a cloud computing environment.

3. The computer-implemented method of claim 1, further comprising calculating a cost for each of the set of providers to provide the set of services.

4. The computer-implemented method of claim 1, further comprising making the configured set of logical components available to the requester.

5. The computer-implemented method of claim 1, the input comprising at least one of the following: a set of requirements, a set of preferences, a set of costs parameters, or a request for feedback.

6. The computer-implemented method of claim 1, the set of logical components being associated with a set of abstraction layers of the networked computing environment.

7. A system for identifying services and associated capabilities in a networked computing environment, comprising:
   a memory medium comprising instructions;
   a bus coupled to the memory medium; and
   a processor coupled to the bus that when executing the instructions causes the system to:
      provide a set of cloud classification codes, wherein each cloud classification code of the set of cloud classification codes corresponds to a predetermined combination of architectural layers from a plurality of architectural layers;
      receive input from a requester via a network node, the input pertaining to a set of services available in the networked computing environment;
      identify a set of capabilities responsive to the input;
      identify a set of logical components of the networked computing environment based on the set of capabilities, wherein each logical component of the set of logical components corresponds to at least one architectural layer of the plurality of architectural layers;
      map the set of logical components to at least one of the set of cloud classification codes based on a match between the at least one architectural layer and the predetermined combination of architectural layers;
      identify and rank a set of providers capable of providing at least one of the set of services based on historical data of past performance of each of the set of providers for a specific classification code from the set of classification codes; and
      configure the set of logical components to provide the set of services according to the input.

8. The system of claim 7, the networked computing environment comprising a cloud computing environment.

9. The system of claim 7, the memory medium further comprising instructions for causing the system to calculate a cost for each of the set of providers to provide the set of services.

10. The system of claim 7, the memory medium further comprising instructions for causing the system to make the configured set of logical components available to the requester.

11. The system of claim 7, the input comprising at least one of the following: a set of requirements, a set of preferences, a set of costs parameters, or a request for feedback.

12. The system of claim 7, the set of logical components being associated with a set of abstraction layers of the networked computing environment.

13. A computer program product for identifying services and associated capabilities in a networked computing environment, the computer program product comprising a non-transitory computer readable storage media, and program instructions stored on the non-transitory computer readable storage media, to:

provide a set of cloud classification codes, wherein each cloud classification code of the set of cloud classification codes corresponds to a predetermined combination of architectural layers from a plurality of architectural layers;

receive input from a requester on via a network node, the input pertaining to a set of services available in the networked computing environment;

identify a set of capabilities responsive to the input;

identify a set of logical components of the networked computing environment based on the set of capabilities, wherein each logical component of the set of logical components corresponds to at least one architectural layer of the plurality of architectural layers;

map the set of logical components to at least one of the set of cloud classification codes based on a match between the at least one architectural layer and the predetermined combination of architectural layers;

identify and rank a set of providers capable of providing at least one of the set of services based on historical data of past performance of each of the set of providers for a specific classification code from the set of classification codes; and configure the set of logical components to provide the set of services according to the input.

14. The computer program product of claim 13, the networked computing environment comprising a cloud computing environment.

15. The computer program product of claim 13, the non-transitory computer readable storage media further comprising instructions for causing the system to calculate a cost for each of the set of providers to provide the set of services.

16. The computer program product of claim 13, the non-transitory computer readable storage media further comprising instructions for causing the system to make the configured set of logical components available to the requester.

17. The computer program product of claim 13, the input comprising at least one of the following: a set of requirements, a set of preferences, a set of costs parameters, or a request for feedback.

18. The computer program product of claim 13, the set of logical components being associated with a set of abstraction layers of the networked computing environment.

19. A method for deploying a system for identifying services and associated capabilities in a networked computing environment, comprising:

providing a computer infrastructure being operable to:
provide a set of cloud classification codes, wherein each cloud classification code of the set of cloud classification codes corresponds to a predetermined combination of architectural layers from a plurality of architectural layers;

receive input from a requester via a network node, the input pertaining to a set of services available in the networked computing environment;

identify a set of capabilities responsive to the input;

identify a set of logical components of the networked computing environment based on the set of capabilities, wherein each logical component of the set of logical components corresponds to at least one architectural layer of the plurality of architectural layers;

map the set of logical components to at least one of the set of cloud classification codes based on a match between the at least one architectural layer and the predetermined combination of architectural layers;

identify and rank a set of providers capable of providing at least one of the set of services based on historical data of past performance of each of the set of providers for a specific classification code from the set of classification codes; and configure the set of logical components to provide the set of services according to the input.

\* \* \* \* \*